Patented July 8, 1924.

1,500,366

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.   Application filed April 12, 1923.   Serial No. 631,697.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water and my invention relates, but is not limited, to the ethers having that property. In a comprehensive search for solvents by means of which strong, thick, flowable compositions or dopes containing such ethers may be prepared, I have discovered that methyl acetone is an excellent solvent for this purpose either alone or with the addition of ethyl acetate, methyl alcohol, methyl acetate and the like. The compositions thus obtained are sufficiently strong to be used in the manufacture of photographic film base by customary methods or to be used in the other plastic arts. Of course, thinner solutions can be used in the preparation of varnishes.

Methyl acetone is a commercial mixture of methyl alcohol, acetone and methyl acetate with a few minor impurities. It is obtained during the refining of methyl alcohol following the destructive distillation of wood. While the proportions of the ingredients vary, the methyl alcohol, acetone and methyl acetate always form the main constituents. The resulting methyl acetone is a solvent for cellulose ether in spite of the variations in the percentages of these particular substances. A typical methyl acetone analysis shows the following main constituents: methyl alcohol 16 per cent, acetone 49 per cent, and methyl acetate 21 per cent, the residue comprising small amounts of various substances.

Not only can the methyl acetone be used by itself to dissolve the cellulose ether, say 1 part of the latter in from 4 to 6 parts by weight of the methyl acetone; but diluents or auxiliary solvents can also be employed. For example, 75 parts of methyl acetone may be mixed with 25 parts by weight of ethyl acetate. Alternatively 25 parts of methyl alcohol can be added in order to increase the proportion of this ingredient. As another example, which is particularly useful, 50 parts of methyl acetone may be mixed with 50 parts of methyl acetate, so that it will predominate in the dope. For film manufacture, 4 to 6 parts of any of said mixtures are combined with 1 part by weight of cellulose ether, such as water-insoluble ethyl cellulose.

Other substances which impart additional suppleness, or incombustibility, or other qualities, to the film may also be added to the dope, such, for instance, as triphenyl or tricresyl phosphate, monochlornaphthalene, camphor, etc. The ingredients are of the ordinary commercial type and sufficiently purified for the process of film manufacture, so as to give a dope yielding films having the proper relative freedom from color. The viscous-flowable dopes above described can be used in connection with the usual film-forming apparatus without the necessity of expensive alterations in the latter.

Having thus described my invention, what I claim as new and desire to secure by Letters Patent is:

1. A composition of matter comprising cellulose ether and methyl acetone.

2. A composition of matter comprising an alkyl ether of cellulose, methyl acetone and a diluent.

3. A composition of matter comprising water-insoluble ethyl cellulose, methyl acetone and ethyl acetate.

4. A composition of matter comprising 1 part of water-insoluble ethyl cellulose dissolved in from 4 to 6 parts by weight of a mixed solvent, said mixed solvent comprising 3 parts by weight of methyl acetone to 1 part by weight of ethyl acetate.

Signed at Rochester, New York, this 4th day of April, 1923.

STEWART J. CARROLL.